W. G. HOWE.
TRACTOR STRUCTURE.
APPLICATION FILED JUNE 21, 1920.

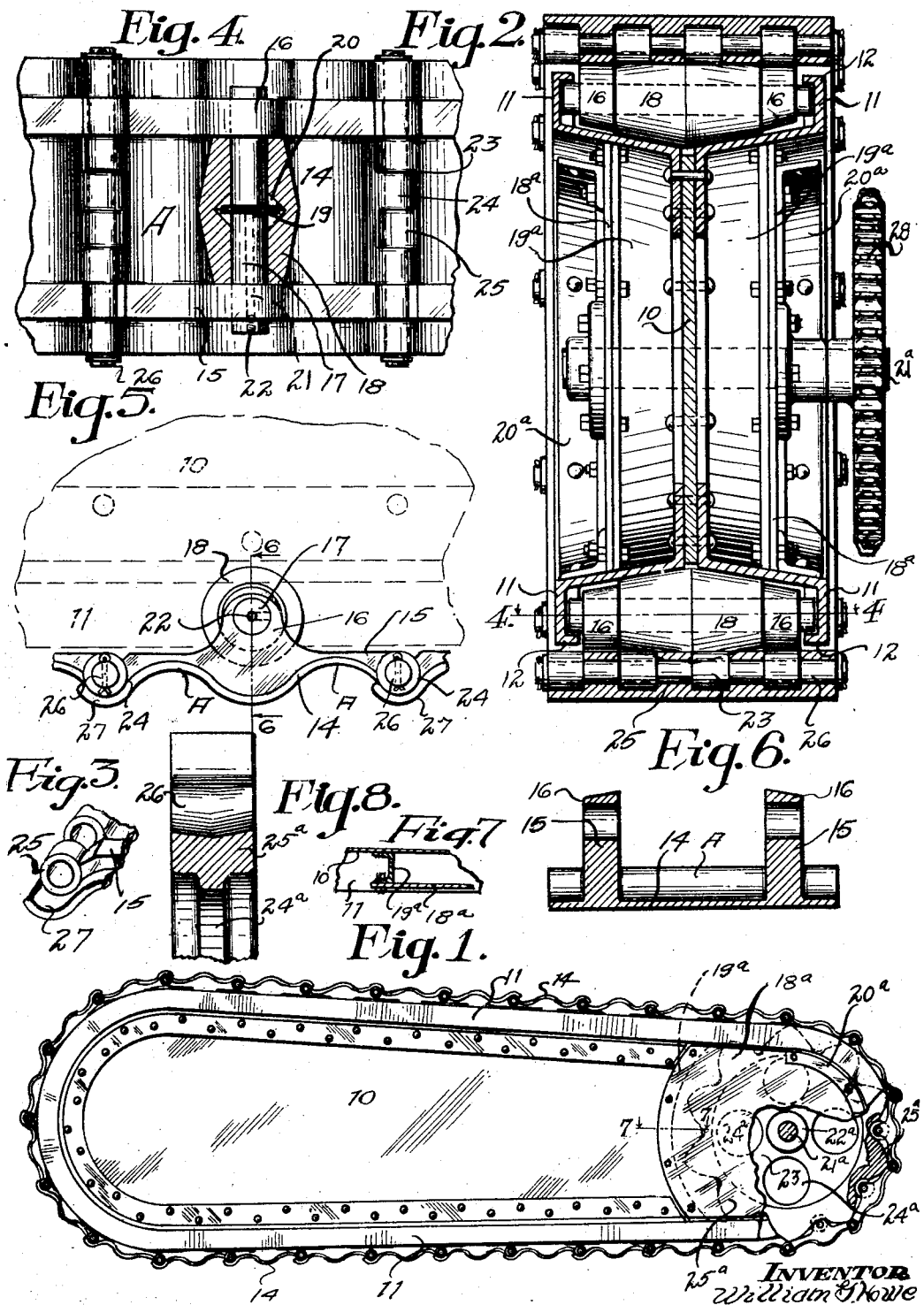

1,400,218.

Patented Dec. 13, 1921.
2 SHEETS—SHEET 2.

INVENTOR
William G. Howe
By Orwig + Bair Att'ys

Witness
R. E. Jarvis

UNITED STATES PATENT OFFICE.

WILLIAM GARFIELD HOWE, OF DES MOINES, IOWA.

TRACTOR STRUCTURE.

1,400,218.  Specification of Letters Patent.  Patented Dec. 13, 1921.

Application filed June 21, 1920. Serial No. 390,636.

*To all whom it may concern:*

Be it known that I, WILLIAM G. HOWE, a citizen of the United States, and a resident of Des Moines, in the county of Polk and State of Iowa, have invented a certain new and useful Tractor Structure, of which the following is a specification.

The object of my invention is to provide a tractor structure of novel construction, particularly of the creeping tread type, in which there is provided an endless track and a sectional endless tread member having anti-friction rollers arranged to travel around said track.

A further object is to provide in connection with such a structure, suitable means for causing the endless tread member to travel.

Still a further object is to provide in a tractor structure a pair of creeping tread members of novel construction and mounting.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a creeping tread device forming a part of my invention, parts being shown in section, and parts being broken away.

Fig. 2 shows a detail, sectional view taken on the line 2—2 of Fig. 9.

Fig. 3 shows a perspective view of part of one of the moving tread members.

Fig. 4 shows a detail, sectional view taken on the line 4—4 of Fig. 2, the frame and track structure being omitted, in order to more clearly illustrate the appearance and structure of the inner surface of the endless tread device.

Fig. 5 is a side elevation of a unit of the endless tread structure.

Fig. 6 is a detail, sectional view taken on the line 6—6 of Fig. 5, of one of the tread members of the endless tread structure, the roller being omitted.

Fig. 7 is a detail, sectional view taken on the line 7—7 of Fig. 1, illustrating part of the frame structure.

Fig. 8 is a detail, sectional view of part of the rotary member.

Figure 9:
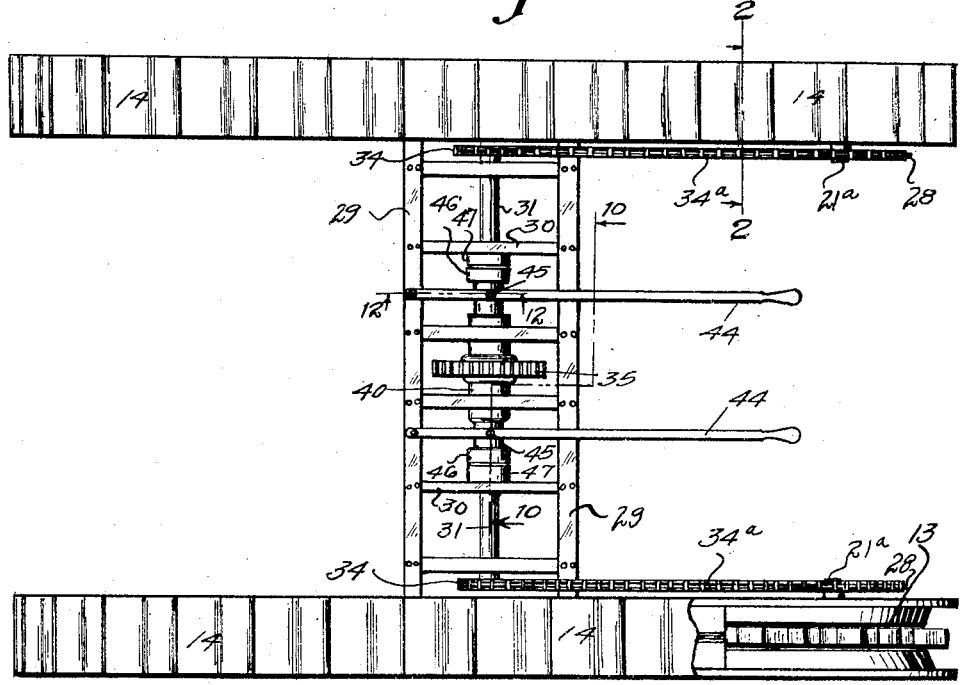
Fig. 9 is a top or plan view of my creeping tread device, and the mechanism for connecting two of such devices in a tractor, parts being broken away.
Figure 10:
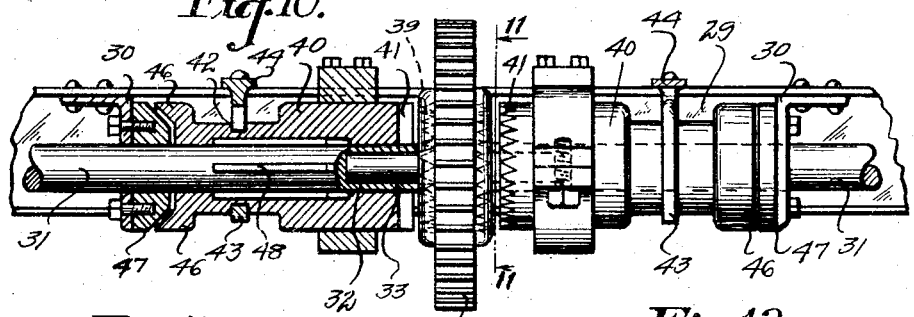
Fig. 10 is a detail, sectional view taken on the line 10—10 of Fig. 9.

It is one of the great purposes of my invention to provide in a tractor a creeping tread structure of the type in which a solid rigid track is provided, and in which the endless tread member is provided with anti-friction devices which travel in such track.

I preferably use two of the creeping tread devices in a tractor.

Referring to Figs. 1 and 2 I have used the reference numeral 10 to indicate the vertical plate forming the central frame of one of the creeping tread devices.

At the periphery of the frame 10 is a track which extends entirely around the frame and is illustrated in section in detail in Fig. 2. This track comprises an outwardly opening channel, the bottom of which is slightly deeper at its central portion than at its sides. This channel-shaped track is indicated by the reference character 11.

The side flanges of the track 11 are provided at their outer edges with inwardly extending flanges 12. At one end of the creeping tread device the central portion of the track is cut away as indicated at 13 in Fig. 9, and a portion of the frame 10 is also cut away. Traveling on the track already described, which is rigid and solid, is an endless tread member comprising a series of sections 14. Each section comprises a transversely waved or corrugated plate A. Near each side edge of each tread plate A is an inwardly extending flange 15. The central portion of each flange 15 is projected inwardly to form a bearing 16. Mounted in the opposite bearings 16 of each tread member section is a spindle or axle 17. On each spindle or axle 17 between the opposite bearings 16 is a roller 18. The greatest diameter of the roller 18 is at its central portion, and it is slightly tapered toward its ends from its central portion to fit the peculiar shape of the track 11, and to travel thereon.

In the central part of the interior of the roller 18 is a recess in which may be mounted a chain or the like 19 for agitating oil.

Each axle 17 has a hole extending from the recess, which is indicated by the reference character 20, to the end of the axle. This hole or passage is shown by dotted lines in Fig. 4 and is indicated by the reference character 21. The hole is plugged up at the outer end by means of a plug 22.

The passage 21 is provided for lubricant. The tread member sections A are hinged together successively in the following manner.

At one end of each of said tread member sections there is provided an alternate series of notches 23 and bearings 24. At the opposite end of each adjacent section there is provided a series of bearings 25 arranged to be received in the respective notches 23. Spindles or pintles 26 are extended through the respective bearings 24 and 25. The last described end of each tread section member A is provided on its lower surface with a projecting and protecting strip 27 which overlaps the outside of the bearings just described, and serves as a means for protecting the joints from dust, and mud and the like.

It will be seen that I have provided a continuous, endless tread device supporting proper rollers which travel around the rigid track 11. Enough of the track 11 is left at the end of the creeping tread member to properly support the endless tread device rollers during their travel around the end.

At one end of each creeping tread device is a rotary member to which rotation is imparted from an engine or the like in a manner hereinafter described, and from which motion is imparted to the endless tread device.

At said end of the creeping tread device there are provided spaced side plates 18ª. At the end of the plates 18ª on each side of the machine, adjacent to the center of the creeping tread device, between said plates and the frame 10, is a curved channel-bar 19ª shown in dotted lines in Fig. 1, in elevation in Fig. 2, and in section in Fig. 7. The two plates 18ª are bolted to the respective channel-bars 19ª, and the respective plates 19ª are bolted to the member 11. The plate 18ª has on its outer surface, near its outer end, a curved angle-iron 20ª, for reinforcing.

Extending through the plates 18ª is a shaft 21ª which serves to support and strengthen said plates, and to hold them properly spaced.

On the shaft 21ª between the plates 18ª is a hub 22ª on which is formed a disk 23ª forming a wheel. In the disk 23ª are holes 24ª for reducing the weight of the rotary wheel at the end of the creeping tread device.

At the periphery of the disk 23ª is a thickened rim 25ª provided with spaced series of transverse pockets 26ª. These pockets 26ª are designed to receive the rollers 18 and are shaped as illustrated in Fig. 8, to fit the central portions of said rollers.

On one end of the shaft 21ª is a sprocket wheel 28. I provide two of these creeping tread devices arranged opposite each other laterally as shown in Fig. 9, and connected between the frame plates 10 by means of transverse frame members 29. The frame structure shown herein is simply for purposes of illustration. The transverse frame members 29 are preferably connected by frame members 30. Mounted in the frame members 30 are alined shafts 31, the adjacent ends of which are provided with cylindrical sockets 32 to receive the ends of a short connecting shaft 33. On the outer ends of the shafts 31 are sprocket gears 34 alined with the respective sprocket wheels 28.

Figure 11:
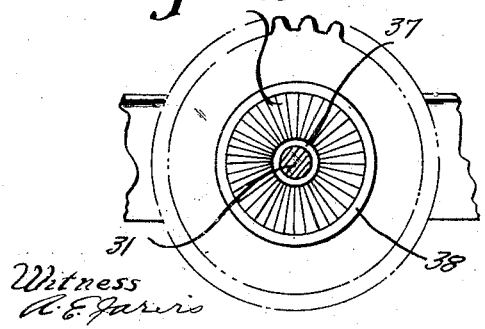
Fig. 11 is a detail, sectional view taken on the line 11—11 of Fig. 10.
Figure 12:
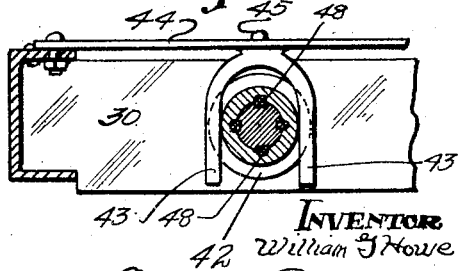
Fig. 12 is a detail, sectional view taken on the line 12—12 of Fig. 9.

On the alined sprocket gears 34 and 28 are chains 34ª. On the short central connecting shaft 33 is a rotatably mounted gear 35. On each side of the gear 35 is formed a brake member. On each side of the gear 35 on the hub thereof is an annular, smooth rib 37. At the outer part of the hub on each side of the gear 35 is an annular smooth rib 38. Between the ribs 37 and 38 on each side of the gear 35 there is formed in the hub radially arranged teeth 39, illustrated particularly in Fig. 11. Slidably mounted on the respective shaft members 31, on the opposite sides of the gear 35 are sleeves 40. On the end of each sleeve 40 adjacent to the gear 35 is a clutch member having teeth 41 adapted to coact with the teeth 39, and forming a brake or clutch member. In each sleeve 40 is an annular groove 42, in which the arms 43 of a yoke shaped brake shifting member are received. Pivoted to one of the frame members 29 are clutch shifting levers 44. The respective levers 44 are pivoted as at 45 to the respective clutch shifting yoke 43. At the outer end of each sleeve 40 is one member of a cone-clutch device, indicated by the reference character 46. Fixed on one of the frame members 30 adjacent to each clutch or brake member 46, is a coacting member of a cone-clutch, indicated by the reference character 47.

I will now describe the practical operation of my improved creeping tread tractor structure.

It may be mentioned in this connection that the gear 35 is rotated from any suitable source of power. When it is desired to throw into gear one of the creeping tread devices, the appropriate lever 44 is shifted for throwing the clutch members 41 and 39 into coacting engagement, whereby rotation will be imparted from the gear 36 to the sleeve 40, with which said gear is connected.

It should be mentioned here that each sleeve 40 is slidably but non-rotatably mounted on the shaft 31 by means of a spline 48.

When rotation is imparted to the sleeve 40, it will be seen that each shaft 31 will be rotated for rotating the wheel device of the connected creeping tread member through the sprocket 34 and 28, and the chain 34ᵃ.

The other creeping tread member can be operated from the gear 35 in the same manner.

It will be seen that either of the sleeves 40 may be left in what may be called neutral position.

If it is desired to turn a wide corner or to turn the tractor without making a sharp curve, one creeping tread device is connected with the gear 35, and the other is disconnected.

If it is desired to turn more sharply, one of the sleeves 40 may be shifted by means of the proper lever 44 for drawing the cone-clutch member more or less firmly into engaging position. By tightly gripping the cone-clutch member a very sharp corner may be turned. By allowing some slippage, the corner may be turned more or less sharply as may be desired.

With ordinary caterpillar type tractors in which a differential is used between two creeping tread members, some sort of a brake device is ordinarily used, whereby one of the tread members can be stopped or held against rotation.

The result of applying the brake to one of the creeping tread members in a machine using an ordinary type of differential is to double the speed of the other tread member. This is undersirable and results in actual practice with creeping tread tractors, in a series of jerks while the machine is turning a corner. It will be seen that with my device, on account of the peculiar construction of the power transmitting mechanism, that when one creeping tread device is thrown out the speed of the other remains the same. Furthermore the speed of the device and the sharpness of the turn may be greatly varied and accurately regulated by the use of the cone-clutches.

It will be seen that when rotation is imparted to the wheel device at the end of the creeping tread members the pockets 26ᵃ will engage the rollers 18 for imparting movement to the endless tread device. The endless tread device travels in a rigid track which gives a stronger structure and results in less wear and vibration and shock than with a tread of the type using two or more rotary members over which sections of a chain-like structure travel.

The shape of the channel-shaped track and the shape of the rollers 18 and of the bearings 16, as illustrated for instance, in Fig. 2, all contribute to the production of a machine having the following advantages.

It will be noted that the shape of the track and rollers is such as to reduce the side thrust of the rollers against the side of the track to a minimum. The tapered ends of the rollers provide a structure such that the imposition of weight on the endless tread members always tends to center the rollers with relation to the track.

Furthermore the shape of the track and the rollers is such that practically no mud or pebbles or anything of that kind will get into the track and remain therein. Rocks and the like cannot get into the working parts of my tractor.

There are no exposed rollers on to which mud or dirt may fall.

With the ordinary creeping tread structure, the hinged sections of the endless tread travel over a series of rollers mounted on the frame of the machine.

On account of the necessary flexibility of the endless tread device. the endless tread device will, especially in the top stretch, flex and buckle more or less which makes the machine very noisy.

In the old creeping tread structure the sections of the endless tread device are alternately supported by the rollers on the main frame, and left without any support whatever. With my structure each section of the endless tread device is firmly supported in its proper position in the track at all times in its movement.

The old structure may be compared to a series of slats, for instance, connected by chains and forming an endless tread device and arranged to travel over rollers. The path of travel of the slats or tread members will be more or less wave-like and rough.

In my structure I have secured a true roller bearing effect.

The old structure might be compared to one set of rollers traveling over another set of rollers. My structure may be compared to one set of rollers traveling in a true channel.

When my creeping tread device starts to go up a hill or over a rough place, another advantage of its structure appears. It will be seen that the strain, when one end of the device starts to rise, is not imposed on one or two rollers, as would be the case in the older type of creepers, but is spread over the whole supporting frame and track.

It will be seen that I have provided a creeping tread structure which can be used in place of a wheel or the like, either with or without the addition of mechanism by which power is transmitted from an engine to the tread members.

It is my intention to cover by my claims the use of mechanical equivalents which may be reasonably included within the scope of such claims.

I claim as my invention:

1. In a creeping tread structure, a rigid upright horizontally elongated frame, a circumferential track thereon, slightly deeper at its central portion than at its side edges, inwardly opening channels at the sides of said track, an endless tread device comprising pivoted sections, bearings on the respective sections, spindles mounted in said bearings having their ends received in the channels at the sides of the track, and rollers on the central portions of the respective spindles, shaped to fit the track whereby the endless tread device may travel in a rigid track, and the weight of the device tends to keep the rollers centered with relation to the track.

2. In a creeping tread structure, a rigid upright horizontally elongated frame, a circumferential track thereon, slightly deeper at its central portion than at its side edges, inwardly opening channels at the sides of said track, an endless tread device comprising pivoted sections, bearings on the respective sections, spindles mounted in said bearings having their ends received in the channels at the sides of the track, rollers on the central portions of the respective spindles, shaped to fit the track whereby the endless tread device may travel in a rigid track, said frame and the central portion of said track being cut away at one end of the machine, and a rotary device mounted at the end of the creeping tread structure having pockets for receiving said rollers.

3. In a creeping tread tractor structure, a frame having at its periphery a channel-shaped track deeper at its central portion than at its sides, a flexible endless tread device arranged to travel in said track, having spindles for connecting successive parts and having between said successive spindles rollers shaped to fit said track, said track being cut away at one end and a rotary member supported at said end and projecting through the cut away portion of said track, and having pockets shaped to fit said rollers for co-acting with said endless tread device.

Des Moines, Iowa, March 12, 1920.

WILLIAM GARFIELD HOWE.